(12) United States Patent
Simionescu et al.

(10) Patent No.: US 11,995,314 B2
(45) Date of Patent: May 28, 2024

(54) MEMORY MANAGEMENT

(71) Applicant: Micron Technology, Inc., Boise, ID (US)

(72) Inventors: Horia C. Simionescu, Foster City, CA (US); Chung Kuang Chin, Saratoga, CA (US)

(73) Assignee: Micron Technology, Inc., Boise, ID (US)

( * ) Notice: Subject to any disclaimer, the term of this patent is extended or adjusted under 35 U.S.C. 154(b) by 225 days.

(21) Appl. No.: 17/543,039

(22) Filed: Dec. 6, 2021

(65) Prior Publication Data

US 2023/0176731 A1    Jun. 8, 2023

(51) Int. Cl.
*G06F 3/06* (2006.01)
*G06F 12/10* (2016.01)
*G06F 12/123* (2016.01)
*G06F 12/0802* (2016.01)

(52) U.S. Cl.
CPC .......... *G06F 3/0604* (2013.01); *G06F 3/0644* (2013.01); *G06F 3/0673* (2013.01); *G06F 12/10* (2013.01); *G06F 12/124* (2013.01); *G06F 12/0802* (2013.01); *G06F 2212/452* (2013.01)

(58) Field of Classification Search
CPC .... G06F 3/0604; G06F 3/0644; G06F 3/0673; G06F 12/00; G06F 12/10; G06F 12/124; G06F 12/0802; G06F 13/00
See application file for complete search history.

(56) References Cited

U.S. PATENT DOCUMENTS

| | | | |
|---|---|---|---|
| 5,603,063 A * | 2/1997 | Au | G06F 3/0601 710/52 |
| 7,779,224 B2 | 8/2010 | Zohar et al. | |
| 8,266,501 B2 | 9/2012 | Jeddeloh | |
| 10,083,097 B2 | 9/2018 | Storm et al. | |
| 2012/0278516 A1 * | 11/2012 | Meichle | G06F 13/4059 710/52 |
| 2014/0146876 A1 * | 5/2014 | Takehara | H04N 19/147 375/240.02 |
| 2017/0132270 A1 | 5/2017 | Ahmed et al. | |
| 2018/0095719 A1 * | 4/2018 | Winestock | G06F 7/08 |
| 2020/0371863 A1 * | 11/2020 | Stoakes | G06F 3/0665 |

* cited by examiner

*Primary Examiner* — Tuan V Thai
(74) *Attorney, Agent, or Firm* — Brooks, Cameron & Huebsch, PLLC

(57) ABSTRACT

Managed units (MUs) of data can be stored on a memory device according to a slice-based layout. A slice of the slice-based layout can include a plurality of stripes, each of the stripes including respective partitions and respective MUs of data. A subset of the stripes each include a quantity of partitions and a first quantity of MUs of data. Another subset of the stripes each include a lesser quantity of partitions and a lesser quantity of MUs of data.

18 Claims, 13 Drawing Sheets

MEMORY MANAGEMENT

TECHNICAL FIELD

The present disclosure relates generally to memory devices, and more particularly, to apparatuses and methods related to memory management.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

BRIEF DESCRIPTION OF THE DRAWINGS

FIGS. 6A-6B are diagrams representative of a stripe-based layout in accordance with a number of embodiments of the present disclosure.

FIGS. 9A-9B are diagrams representative of hash tables and an overflow CAM for drift management in accordance with a number of embodiments of the present disclosure.

FIGS. 10A-10B are diagrams representative of a write aggregating CAM for stripe management in accordance with a number of embodiments of the present disclosure.

DETAILED DESCRIPTION

Figure 1:
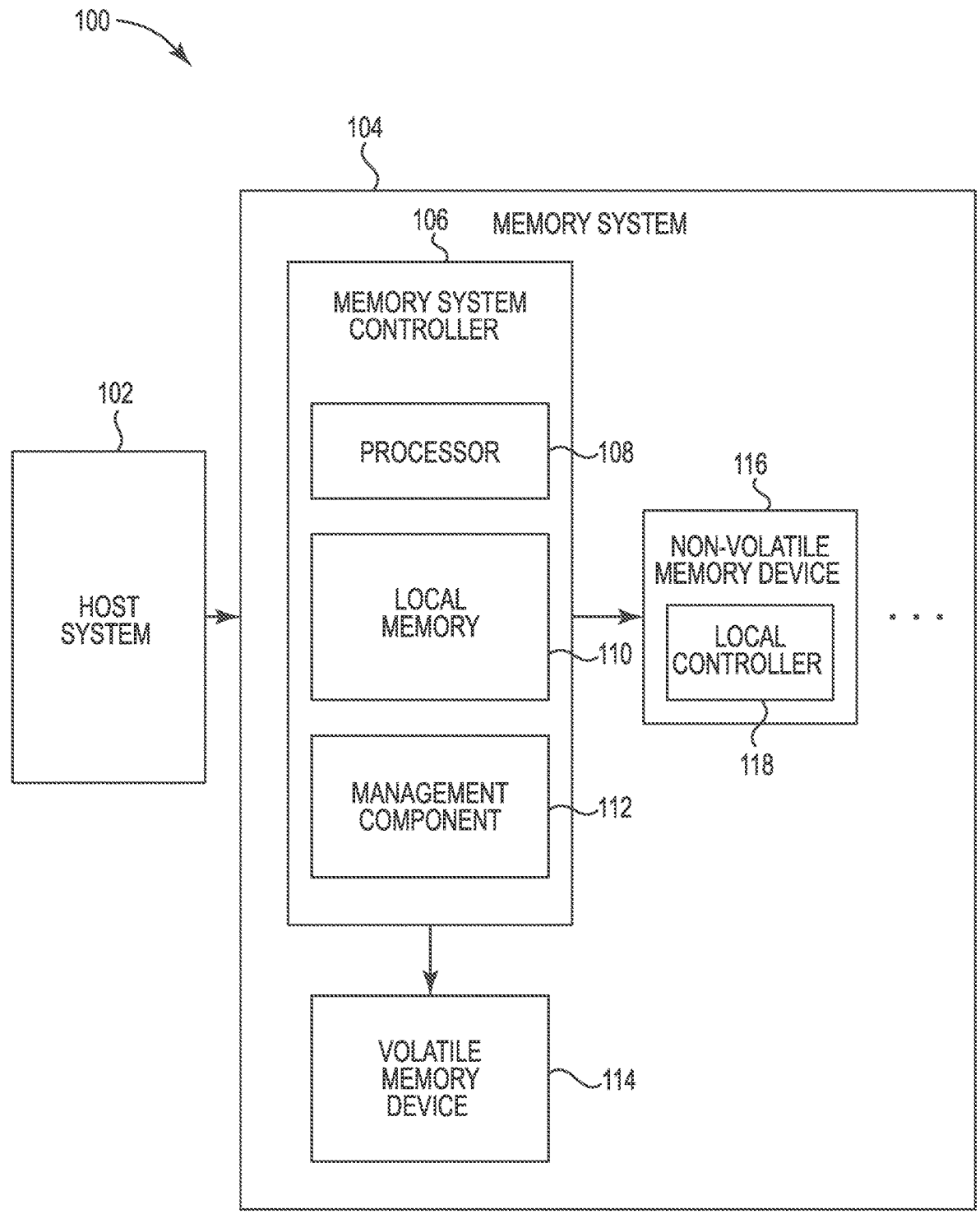
FIG. 1 is a block diagram of an apparatus in the form of a computing system including a memory device in accordance with a number of embodiments of the present disclosure.

The present disclosure includes apparatuses and methods related to memory management. Managed units (MUs) of data stored on a memory device (such as three-dimensional cross-point ("3D cross-point") memory device, which is a cross-point array of non-volatile memory cells) according to various logical layouts. The logical addresses (e.g., logical block addresses (LBAs)) can be organized (by a controller, for example) into MUs. MUs refer to a unit of memory managed by the controller. A MU can correspond to a logical block size (e.g., a data transfer size of a host and/or a data management size of a memory system). A MU can be mapped to a physical block of memory cells. However, embodiments are not so limited. For example, a MU can correspond to more than a logical block size. Some embodiments of the present disclosure include storing MUs of data according to a slice-based layout. Slice-based layouts are described in association with FIGS. 2-5. Some embodiments of the present disclosure include storing MUs of data according to a stripe-based layout. Stripe-based layouts are described in association with FIGS. 6A-8.

To ensure a delay between two access commands (e.g., requests) for a MU at a same logical address, some embodiments of the present disclosure include drift management. A state of a memory cell can be determined (e.g., read) by sensing current through the memory cell responsive to an applied voltage. The sensed current can indicate a data state of the memory cell (e.g., binary data stored by the memory cell). Because of intrinsic properties of memory devices and constituent components thereof, voltage levels associated with memory cells of such memory devices can change and drift over time. As used herein, "drift management" refers to memory operations to mitigate and/or compensate for changes in voltage levels associated with memory cells over time.

In some embodiments, a content addressable memory (CAM) is used to provide drift management by maintaining a record of previous access commands while receiving additional access. In some embodiments, hash tables in conjunction with a CAM are used to provide drift management by maintaining a record of previous access commands while receiving additional access commands as described in association with FIGS. 9A-9C.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The figures herein follow a numbering convention in which the first digit or digits correspond to the drawing figure number and the remaining digits identify an element or component in the drawing. Similar elements or components between different figures may be identified by the use of similar digits. For example, element 222 can represent element 22 in FIG. 2, and a similar element can be labeled 622 in FIG. 6A. Analogous elements within a figure may be referenced with a hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system 100 including a memory system 104 in accordance with some embodiments of the present disclosure. The memory system 104 can include media, such as one or more volatile memory devices 114, one or more non-volatile memory devices 116, or a combination of such.

A memory system 104 can be a storage device, a memory module, or a hybrid of a storage device and memory module, among other types of memory systems. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory systems 104. In some embodiments, the host system 102 is coupled to different types of memory systems 104. FIG. 1 illustrates one example of a host 120 coupled to one memory system 104.

The host system 102 can include a processor chipset and a software stack executed by the processor chipset. The processor chipset can include one or more cores, one or more caches, a memory controller (e.g., an SSD controller), and a storage protocol controller (e.g., peripheral component interconnect express (PCIe) interface controller, SATA controller). The host system 102 can write data to and/or read data from the memory devices 114, 116 of the memory system 104.

The host system 102 can be coupled to the memory system 104 via a physical host interface (not shown). Examples of a physical host interface include, but are not limited to, serial advanced technology attachment (SATA) interface, PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports DDR), Open NAND Flash Interface (ONFI), Low Power Double Data Rate (LPDDR), or any other interface. The physical host interface can be used to transmit data between the host system 102 and the memory system 104. The host system 102 can further utilize an NVMe interface to access components when the memory system 104 is coupled with the host system 102 by the PCIe interface. The physical host interface can provide an interface for passing control, address, data, and other signals between the memory system 104 and the host system 102. FIG. 1 illustrates a memory system 104 as an example. In general, the host system 102 can access multiple memory systems 104 via a same communication connection, multiple separate communication connections, and/or a combination of communication connections.

The non-volatile memory devices 116 and the volatile memory devices 114 can include various combinations of the different types of non-volatile memory devices and volatile memory devices, respectively. Some examples of volatile memory devices can be, but are not limited to, random access memory (RAM), such as dynamic random-access memory (DRAM) and synchronous dynamic random access memory (SDRAM).

Some examples of non-volatile memory include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

The non-volatile memory devices 116 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, the non-volatile memory devices 116 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 116 can be grouped as pages that can refer to a logical unit of the respective memory devices used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the non-volatile memory 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Memory system controller 106 can communicate with the memory devices 114, 116 to perform operations, such as reading data, writing data, and/or erasing data stored on the non-volatile memory devices 116 and the volatile memory devices 114, and other such operations. The memory system controller 106 can include hardware such as one or more integrated circuits and/or discrete components, a buffer memory, or a combination thereof. The hardware can include digital circuitry with dedicated (i.e., hard-coded) logic to perform the operations described herein. The memory system controller 106 can be a microcontroller, special purpose logic circuitry (e.g., a field programmable gate array (FPGA), an application specific integrated circuit (ASIC), etc.), or other suitable processor.

The memory system controller 106 can include a processor 108 (e.g., a processing device) configured to execute instructions stored in a local memory 110. In the illustrated example, the local memory 110 of the memory system controller 106 includes an embedded memory configured to store instructions for performing various processes, operations, logic flows, and routines that control operation of the memory system 104, including handling communications between the memory system 104 and the host system 102.

In some embodiments, the local memory 110 can include memory registers storing memory pointers, fetched data, etc. The local memory 110 can also include read-only memory (ROM) for storing micro-code. Although the memory system 104 is illustrated as including the memory system controller 106, in another embodiment of the present disclosure, a memory system 110 does not include a memory system controller 106, and can instead rely upon external control (e.g., provided by an external host, or by a processor or controller separate from the memory system) to access the memory devices 114 and 116.

In general, the memory system controller 106 can receive commands or operations from the host system 102 and can convert the commands or operations into instructions or appropriate commands to achieve the desired access to the non-volatile memory devices 116 and/or the volatile memory devices 114. The memory system controller 106 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the non-volatile memory devices 116. The memory system controller 106 can further include host interface circuitry to communicate with the host system 102 via the physical host interface. The host interface circuitry can convert the commands received from the host system 102 into command instructions to access the non-volatile memory device 116 and/or the volatile memory device 114 as well as convert responses associated with the non-volatile memory device 116 and/or the volatile memory device 114 into information for the host system 102.

The memory system 104 can also include additional circuitry or components that are not illustrated. In some embodiments, the memory system 104 can include a cache or buffer (e.g., DRAM) and address circuitry (e.g., a row decoder and a column decoder) that can receive an address from the memory system controller 106 and decode the address to access the non-volatile memory device 116 and/or the volatile memory device 114.

In some embodiments, the memory devices (e.g., non-volatile memory device 116) can include a local controller 118 that can operate in conjunction with the memory system controller 106 to execute operations on one or more memory cells of the non-volatile memory device 116. An external controller (e.g., the memory system controller 106) can externally manage the non-volatile memory device 116 (e.g., perform media management operations on the non-volatile memory device 116). In some embodiments, the non-volatile memory device 116 can be a managed memory. Managed memory is raw memory combined with a local controller (e.g., the local controller 118) for media management within the same memory device package. An example of a managed memory device is a managed NAND (MNAND) device.

The memory system 104 can include a management component 112. Although not shown in FIG. 1, the management component 112 can include circuitry to facilitate management of data and commands associated with the non-volatile memory device 116. In some embodiments, the management component 112 can include special purpose circuitry in the form of an ASIC, FPGA, state machine, and/or other logic circuitry. In some embodiments, the memory system controller 106 includes at least a portion of the management component 112. For example, the memory system controller 106 can include the processor 108 (e.g., processing device) configured to execute instructions stored in the local memory 110 for performing the operations described herein.

The management component 112 can cause MUs of data and parity MUs to be stored on a memory device (e.g., the non-volatile memory device 116) according to a slice-based layout. Each slice of the slice-based layout can include a plurality of stripes, and each stripe can include one or more MUs of data and a parity MU. Each MU of a stripe can correspond to a respective channel of a memory device. A subset of the stripes can each include a quantity of MUs of data and a different subset of the stripes can include a different quantity of MUs of data. For instance, the stripes of the different subset can include fewer MUs of data than stripes of the subset.

The management component 112 can execute commands associated with each respective stripe according to one or more scheduling policies. The management component 112 can queue commands associated with each respective stripe according to respective types of the commands. The management component 112, or the memory system controller 106, can include respective buffers (not shown in FIG. 1) associated with each of the stripes. Each buffer can store commands of a particular type associated with that stripe. The management component 112 can implement linked lists to queue commands associated with each respective stripe. The management component 112 can include respective first in, first out (FIFOs, not shown in FIG. 1) buffers for each channel of the memory device.

The management component 112 can cause MUs of data and parity MUs to be stored by a memory device (e.g., the non-volatile memory device 116) according to a stripe-based layout. The stripe-based layout can include stripes, each stripe including partitions of the memory device. Each partition of the memory device can correspond to more than one stripe. Each MU of data is associated with a respective stripe. The management component 112 can execute commands associated with each respective stripe according to one or more scheduling policies. The management component 112, or the memory system controller 106, can include respective FIFOs for each channel of the memory device. The quantity of FIFOs for each channel of the memory device can be equal to a quantity of stripes for a respective memory address.

The management component 112 can receive bursts of commands, from the host system 102, for instance. The commands can be of different types (e.g., write commands, read commands). The management component 112 can buffer the commands (e.g., store the command in one or more buffers). The commands can be stored by type of command in respective buffers for each type of command.

The management component 112 can, in response to a buffer being full, backpressure a channel of the memory system 104 via which the bursts of commands are received. As used herein, "backpressuring" a channel refers to preventing receipt of commands and/or execution of commands from the channel. The management component 112 can provide a delay of a particular amount of time between execution of a first command and execution of a second command associated with a stripe address corresponding to a MU address of the second command. The management component 112 can, subsequent to the delay, determine whether the stripe address is stored in a CAM (not shown in FIG. 1) of the management component 112. The size of the CAM can be based on a write request rate (e.g., a peak write request rate) of the memory system.

The management component 112 can, in response to determining that the stripe address is stored in the CAM, retrieve the second command from the buffer. The management component 112 can determine whether metadata of the CAM includes the MU address of the second command.

Figure 2:
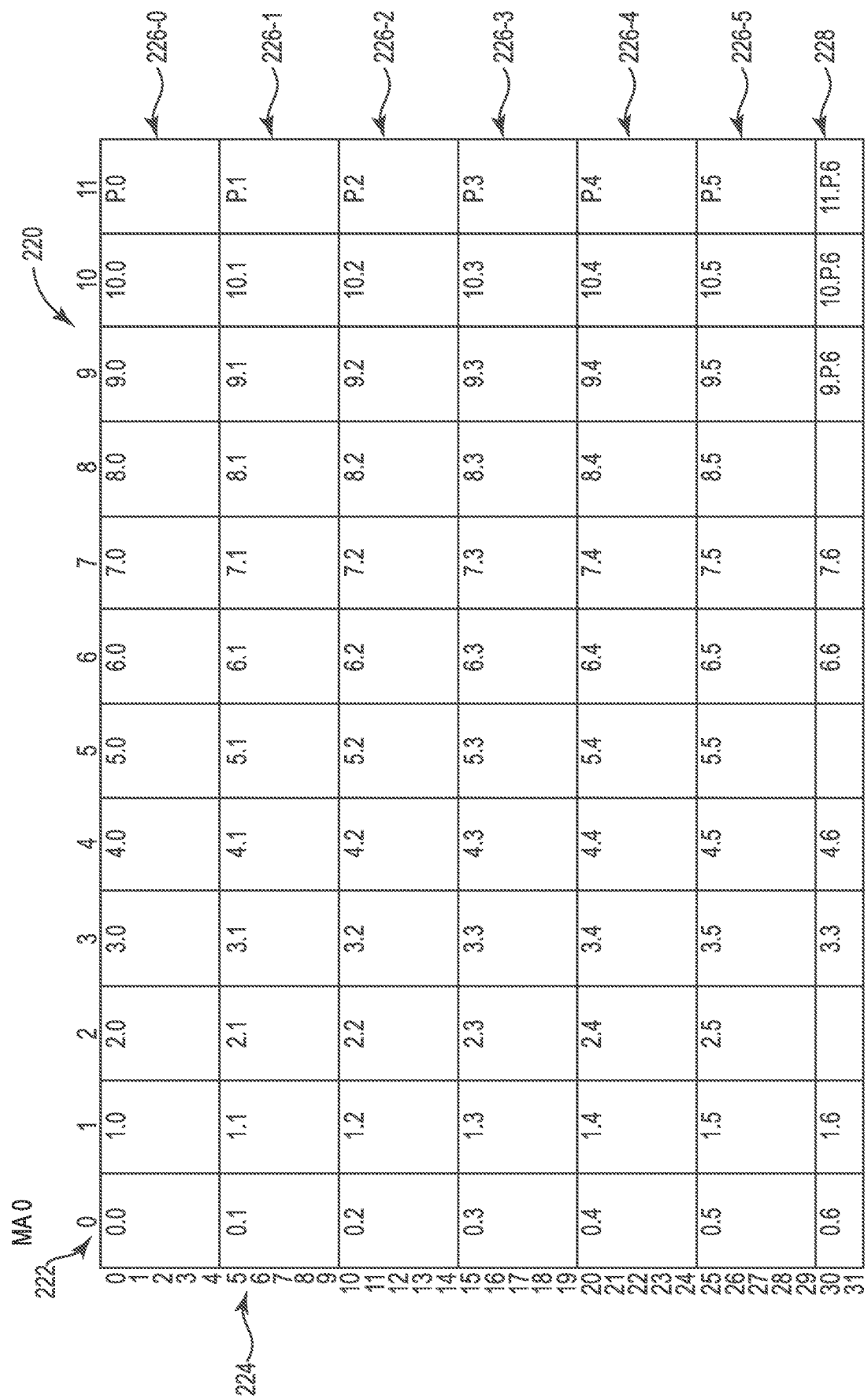
FIG. 2 is a diagram representative of a slice of a slice-based layout in accordance with a number of embodiments of the present disclosure.

FIG. 2 is a diagram representative of a slice 220 of a slice-based layout in accordance with a number of embodiments of the present disclosure. Although other slices are not illustrated by FIG. 2, the slice 220 can be representative of other slices of the slice-based layout. Each slice of a slice-based layout can correspond to a memory address (MA) of a memory device (e.g., the non-volatile memory device 116 described in association with FIG. 1). The slice 220 can correspond to MA 0.

Each column of the slice 220 corresponds to a respective one of channels 222 of the memory device. As illustrated by FIG. 2, there are twelve of the channels 222, numbered 0 to 11. However, embodiments of the present disclosure are not so limited. For example, slice-based layouts described herein can be used with memory device having fewer than twelve channels or greater than twelve channels. Channels 0 to 10 can be associated with MUs of data and channel 11 can be associated with parity MUs.

The slice 220 includes seven stripes 226-0, 226-1, 226-2, 226-3, 226-4, and 226-5 (collectively referred to as the stripes 226) and stripe 228. However, embodiments of the present disclosure are not so limited. For example, slice-based layouts described herein can include slices having fewer than seven stripes or greater than seven stripes. The stripes 226 and the stripe 228 are respective subsets of stripes of the slice 220.

Each row of the slice 220 corresponds to respective one of partitions 224 of the memory device. The partitions 224 correspond to the MA to which the slice corresponds. For example, the partitions 224 correspond to MA 0. In example of FIG. 2, each MA has thirty-two partitions, numbers from 0 to 31. The stripes 226 each include five of the partitions 224. Partitions 0 to 4 correspond to the stripe 226-0. Partitions 5 to 9 correspond to the stripe 226-1. Partitions 10 to 14 correspond to the stripe 226-2. Partitions 15 to 19 correspond to the stripe 226-3. Partitions 20 to 24 correspond to the stripe 226-4. Partitions 25 to 29 correspond to the stripe 226-5. However, the stripe 228 includes two of the partitions 224. Partitions 30 and 31 correspond to the stripe 228.

Embodiments of the present disclosure are not limited to MAs having thirty-two partitions, the stripes 226 including five of the partitions 224, the stripe 228 including two of the partitions, and/or the slice 220 including six full stripes (the stripes 226). For example, MAs can have fewer or greater than thirty-two partitions, full stripes can include fewer or greater than five partitions, partial stripes can include fewer or greater than two partitions, and a slice can include fewer or greater than six full stripes.

Each of the stripes 226 include twelve MUs, one for each of the channels 222. The MUs of the stripes 226 associated with channels 0 to 10 are MUs of data. The MUs of the stripes 226 associated with channel 11 are parity MUs. In contrast, the stripe 228 includes three MUs of data and a parity MU. However, the parity MU of the stripe 228 includes partitions 30 and 31 of channel (9.P.6), partitions 30 and 31 of channel 10 (10.P.6), and partition 30 of channel 11 (11.P.6).

In FIG. 2, MUs of data are identified by a number of the channels 222 and a number of the stripes 226 and the stripe 228. The stripe 226-0 includes MUs of data 0.0, 1.0, 2.0, 3.0, . . . , 10.0; the stripe 226-1 includes MUs of data 0.0, 1.1, 2.1, 3.1, . . . , 10.1; and so on. In FIG. 2, parity MUs are identified by a "P" and a number of the stripes 226 and the stripe 228. The stripe 226-0 includes parity MU P.0, the stripe 226-1 includes parity MU P.1, and so on.

Figure 3:
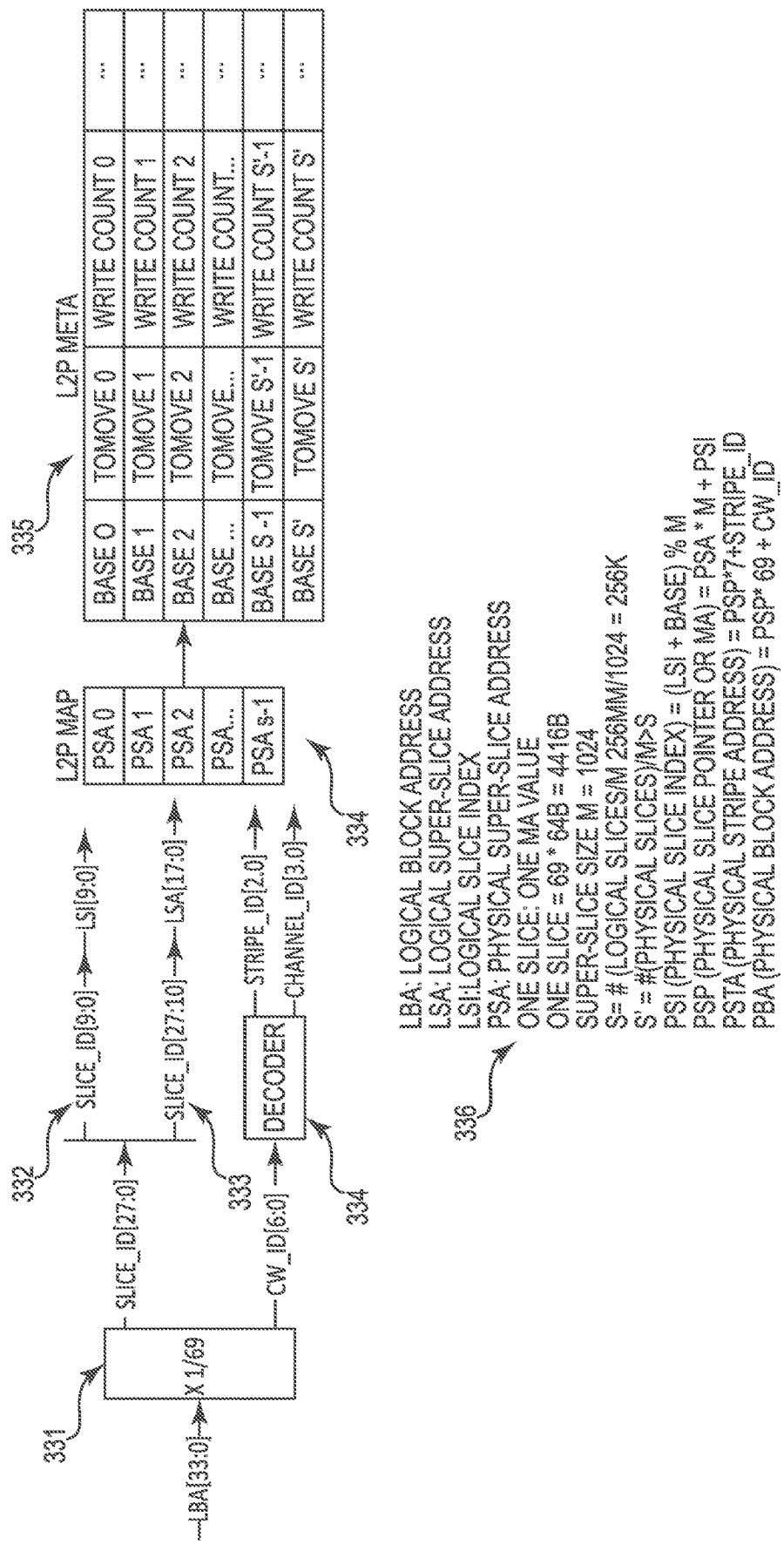
FIG. 3 is a diagram representative of logical to physical address translation for a slice-based layout in accordance with a number of embodiments of the present disclosure.

FIG. 3 is a diagram representative of logical to physical address translation for a slice-based layout in accordance with a number of embodiments of the present disclosure. As used herein, "address translation" refers to determining a physical address (e.g., physical block address, physical media location) of a memory (e.g., memory die, memory bank) of a memory device that corresponds to a logical address (e.g., logical block address (LBA), namespace). Although FIG. 3 illustrates logical to physical address translation for the slice 220 described in association with FIG. 2, logical to physical address translation described herein can be used for other slices of a slice-based layout.

At 336, FIG. 3 includes terminology and definitions associated with logical to physical address translation for the slice 220. However, none of the terminology and definitions described herein are intended to limit embodiments of the present disclosure. A logical block address (LBA) can also be referred to a MU address. A LBA can be divided by a total quantity of MUs of data of a slice to obtain a slice address. The slice 220 includes 69 MUs of data: 11 MUs of data in each of the six stripes 224 and 3 MUs of data in the stripe 228. Thus, at 331, an LBA is divided by 69 to obtain a slice address (slice_id) of the slice 220.

The mathematical remainder from dividing the LBA by the total quantity of MUs of data of a slice can be decoded to obtain a stripe address and/or a channel identifier. The stripe address identifies to which stripe of a slice that the LBA corresponds. At 334, the remainder (cw_id) is decoded to obtain the stripe address (stripe_id) and the channel identifier (channel_id).

As indicated at 332, a portion of the slice address (slice_id [9:0]) is a logical slice index (LSI). An LSI can be used to indicate a specific slice of a super-slice. As used herein, a "super-slice" refers to a group of slices. A LSA can be used to determine a corresponding physical slice index (PSI) and/or a corresponding MA. As used herein, a PSI refers to a physical address of a first MU of a slice (e.g., the beginning of a slice). As indicated at 333, another portion of the slice address (slice_id[27:10]) is a logical super-slice address (LSA). Super-slices are used to reduce the size of a mapping table, such as the mapping table 334. For example, if a slice-based layout includes 256 million slices ("s") and a size of a super-slice ("m") is 1,024 slices, then the length of a mapping table for the slice-based layout is reduced from 256 million entries to 256 thousand entries. Each entry of the mapping table 334 is a physical super-slice address (PSA). The mapping table 334 is used to map the LSA to a PSA of the memory device. Metadata (L2P META 335) of the mapping table 334 provides additional information for address translation. As illustrated in FIG. 3, BASE is for mapping, TOMOVE indicates the super slice is ready to be swapped out as part of endurance mechanism, and WRITE COUNT indicates how many times to which a particular PSA has been written. As indicated at 332, BASE can be used to determine a PSI.

Figure 4:
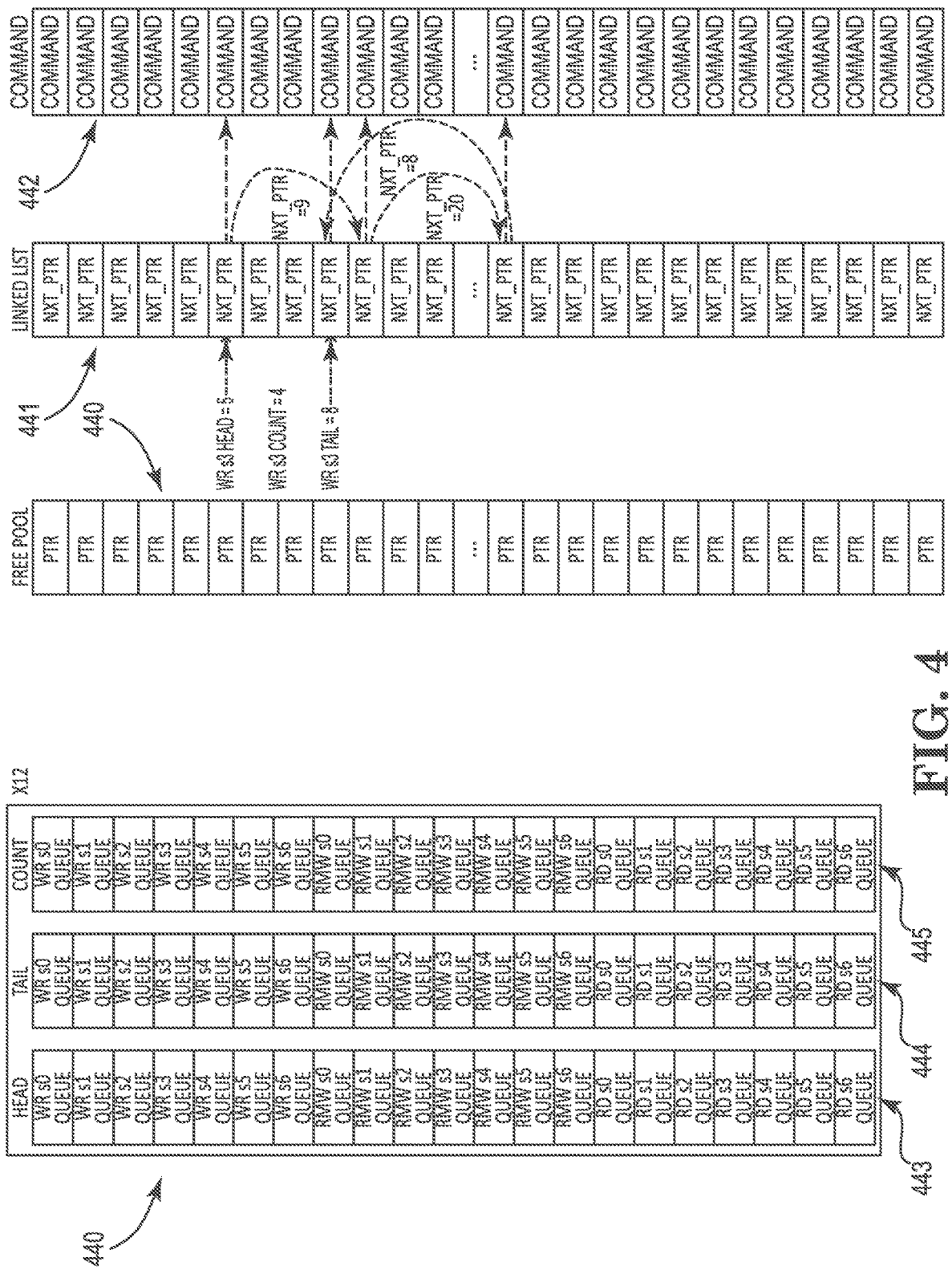
FIG. 4 is a diagram representative of command queuing for a slice-based layout in accordance with a number of embodiments of the present disclosure.

FIG. 4 is a diagram representative of command queuing for a slice-based layout in accordance with a number of embodiments of the present disclosure. For a slice-based layout, each channel of a slice, (e.g., the slice 220 described in association with FIG. 2) can have respective stripe queues. For the slice 220, each of channels 0 to 11 has respective stripe queues corresponding to each of the seven stripes of the slice 220. Stripe queues for a channel include command queues, which can be implemented as buffers. Each of the command queues can be associated with a particular type of command, such as a read queue for read commands, a write queue for write commands, and a read-modify-write (RMW) queue for RMW commands.

In some embodiments, each stripe queue is implemented as a linked list, such as the linked list 440. FIG. 4 illustrates a linked list memory 441 and a command memory 442 that is shared by all of the stripe queues. As illustrated by the stripe queue 440, each of the stripe queues (of which the stripe queue 440 is representative) has a linked list head register 443, a linked list tail register 444, and a linked list count register 445. FIG. 4 illustrates a free pool 446 used for allocation and deallocation of queue entries by all 12 channels of the slice 220.

Before a read command is executed, the read command is enqueued into the read queue of the associated stripe queue. For a write command of a partial stripe, before the write command is executed, an entry of an RMW queue of the associated stripe queue is allocated and then the write command is enqueued in that allocated entry. After the read data is written into the RMW buffer, the write command can be enqueued into its associated write stripe queue. If there is no RMW buffer available, a write command cannot be enqueued into its associated RMW stripe queue. Writing a MU of data can include rewriting an associated parity MU. To rewrite the parity MU, the pre-write ("old") parity MU and the pre-write ("old") MU of data is read from memory (e.g., the non-volatile memory device 116) to compute the post-write ("new") parity MU. Thus, an MU write command can spawn a read command (or respective read commands) for a parity MU and a MU of data read command. The spawned read commands can be enqueued into the RWM queues. However, the write command to rewrite the parity MU cannot be executed until the spawned read commands are executed and the pre-write parity MU and MU of data are stored in the RMW buffer.

A write command of a full stripe can be enqueued into a write queue of the associated stripe queue directly. Writing a full stripe include writing all MUs of data concurrently. Thus, in contrast to writing a partial stripe, writing a full stripe does not require reading pre-write MUs. Rather, the post-write ("new") parity MU is generated directly from newly written MUs of data. A write command of parity can be enqueued into a write queue of the associated stripe queue after the parity has been computed and stored into a parity buffer (not shown in FIG. 4).

A read queue of a stripe queue can include one or more sub-queues: a sub-queue for compute express link (CXL) commands and/or a sub-queue for retry commands. A sub-queue for retry commands can have higher priority to be dequeued than a sub-queue for CXL commands.

Each channel of a slice, including a parity channel, can have a respective command queues scheduler. The command queue schedulers enable execution of commands in command queues according to one or more scheduling policies. The scheduling policies can be based on memory access latencies, rules, and/or timings, for example. Non-limiting examples of scheduling policies follow. Retry queues can have a highest priority. Read queues can have a higher priority than RMW queues. Consecutive execution of a same type of command can be given priority. A command of one type can be promoted after consecutive execution of a particular quantity of commands of a different type. Scheduling of execution of commands from RMW queues can be limited by a size of the RMW queues. Particular stripe queues can be given priority. Stripe queues can be given equal priority (e.g., round robin). Queues of at least a threshold length can be given priority.

Figure 5:
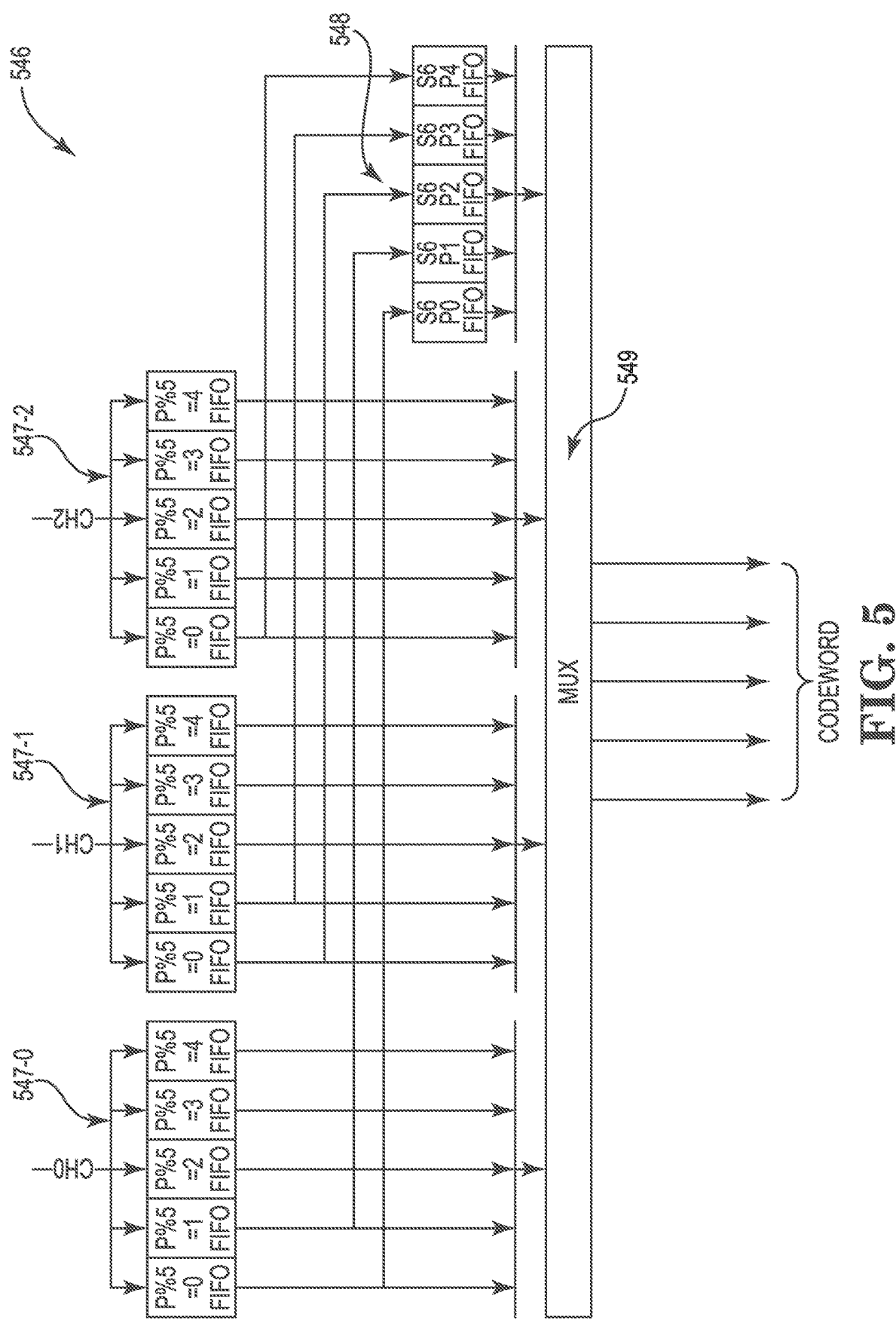
FIG. 5 is a diagram representative of a partition FIFOs arrangement for a channel of a slice-based layout in accordance with a number of embodiments of the present disclosure.

FIG. 5 is a diagram representative of a partition FIFOs arrangement 546 for a channel of a slice-based layout in accordance with a number of embodiments of the present disclosure. Because one or more channels of a slice may have data available at the same time and/or data of a stripe, such as the stripe 228 of the slice 220 as described in association with FIG. 2, has to be read from different channels, the partition FIFOs arrangement 546 is used to buffer data read from a slice prior to sending data to a read buffer. A data path from the partition FIFOs arrangement 546 to a read buffer or a RMW buffer can have bandwidth for all channels of a slice (e.g., 12 channels of the slice 220).

The partition FIFOs arrangement 546 illustrates partition FIFOs for channels 0, 1, and 2 of the slice 220 for clarity. However, the partition FIFOs arrangement 546 can be replicated for channels 3-5, 6-8, and 9-11, respectively, of the slice 220. Each of channels 0, 1, and 2 has five partition FIFOs. If data is read from the stripes 226, then the data is stored into the five partition FIFOs. If data is read from the stripe 228, then the data is stored into two of the partition FIFOs. The partition FIFOs 548 is used to aggregate data read from the channels of the stripe 228. Data from the partition FIFOs 547-0, 547-1, and 547-2 and the partition FIFOs 548 are selected, via the multiplexer (MUX) 549, for sending via the data path.

Figure 6A:
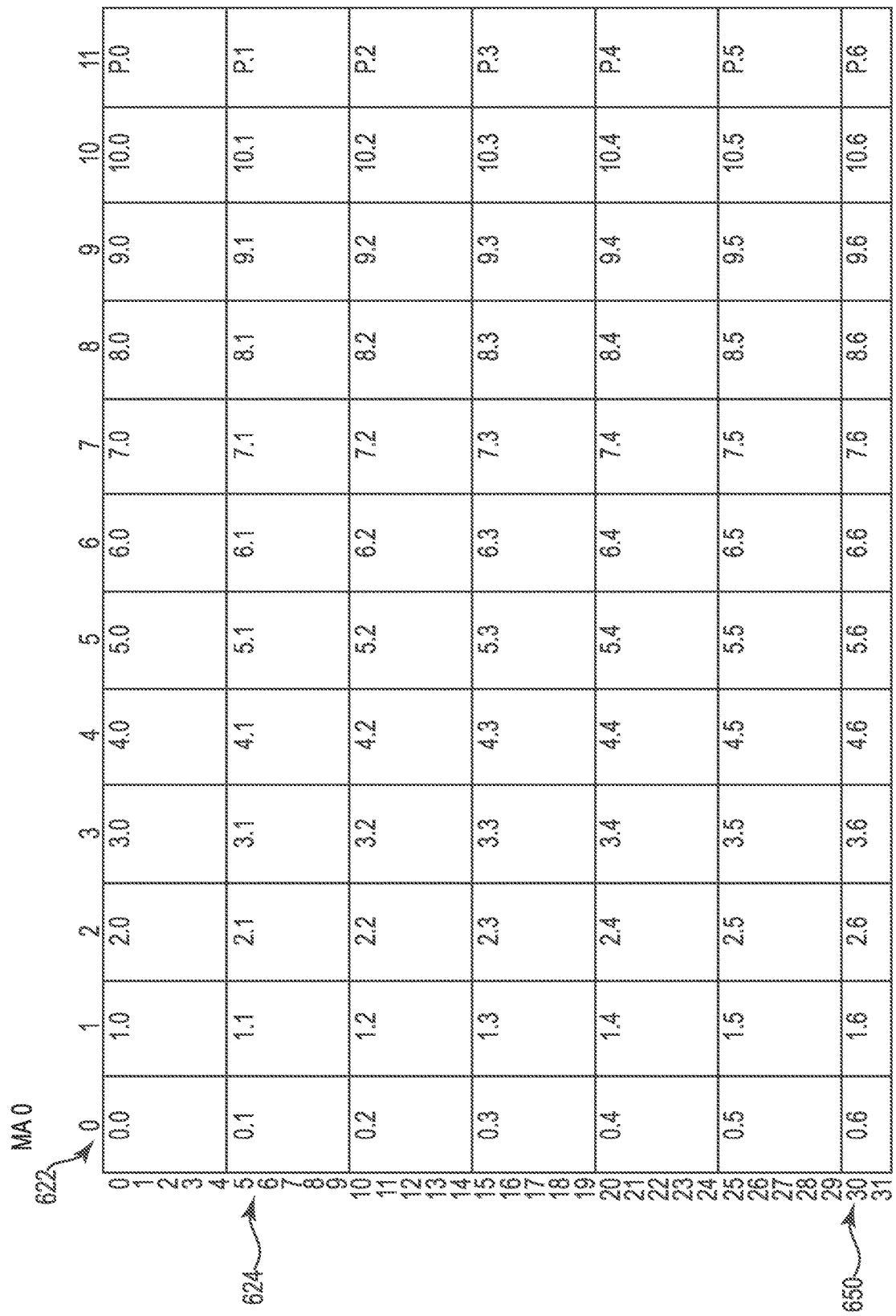
Figure 6B:
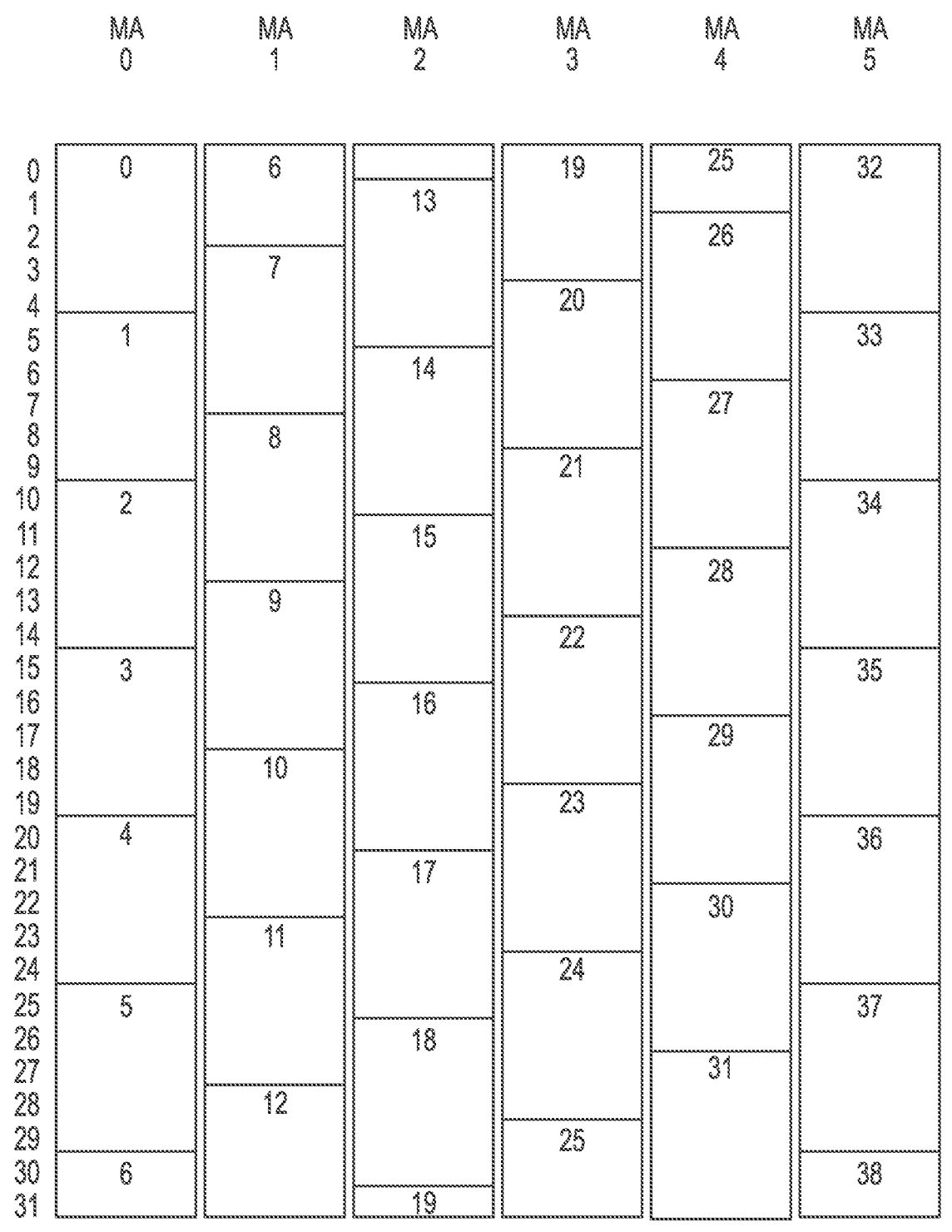

FIGS. 6A-6B are diagrams representative of a stripe-based layout in accordance with a number of embodiments of the present disclosure. FIG. 6A is similar to the slice-based layout described in association with FIG. 2 except for stripe 650 as compared to the stripe 228. As shown in FIG. 6B, the stripe 650 only partially associated with MA 0. The stripe 650 is from other stripes of the stripe-based layout in that the stripe 650 includes only two partitions (partitions 30 and 31) of the five partitions of a stripe. The other 3 partitions of the stripe 650 are partitions 0-2 of MA 1 as illustrated by FIG. 6B. FIG. 6B illustrates the stripe layout for one of the channels 626. Stripe 32 of FIG. 6B is similar to stripe 0 in that stripe 32 begins with partition 0 but of MA 5.

As illustrated by FIG. 6A, there are twelve of the channels 622, numbered 0 to 11. However, embodiments of the present disclosure are not so limited. For example, striped-based layouts described herein can be used with memory device having fewer than twelve channels or greater than twelve channels. The channels 622 and the partitions 624 can be analogous to the channels 222 and the partitions 224, respectively, described in association with FIG. 2.

Embodiments of the present disclosure are not limited to MAs having thirty-two partitions and stripes of a stripe-based layout including five of the partitions 524. For example, MAs can have fewer or greater than thirty-two partitions and stripes can include fewer or greater than five partitions.

Figure 7:
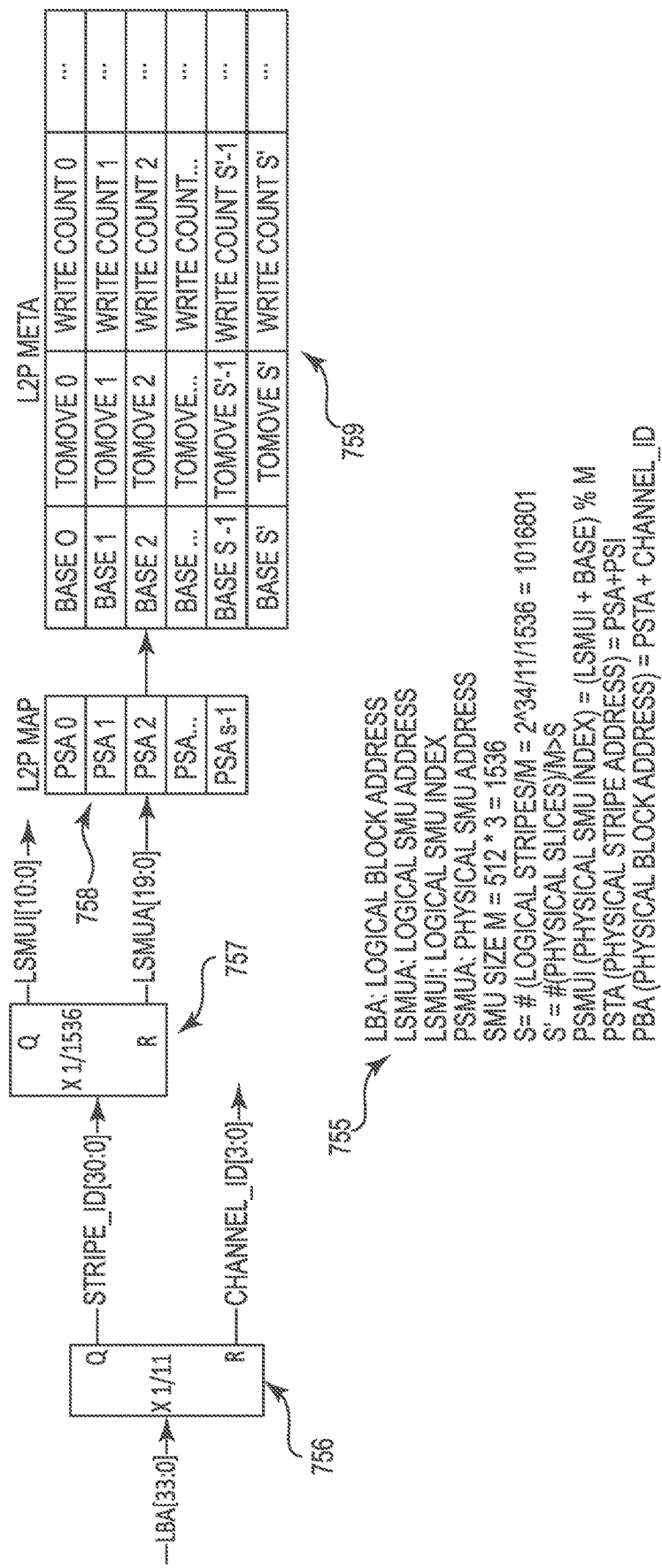
FIG. 7 is a diagram representative of logical to physical address translation for a stripe-based layout in accordance with a number of embodiments of the present disclosure.

FIG. 7 is a diagram representative of logical to physical address translation for a stripe-based layout in accordance with a number of embodiments of the present disclosure. Although FIG. 7 illustrates logical to physical address translation for the stripe-based layout described in association with FIGS. 6A-6B, logical to physical address translation described herein can be used for other stripe-based layout.

At 755, FIG. 7 includes terminology and definitions associated with logical to physical address translation for the stripe-based layout described in association with FIGS. 6A-6B. However, none of the terminology and definitions described herein are intended to limit embodiments of the present disclosure. A LBA can be divided by a total quantity of MUs of data of a stripe to obtain a stripe address. The stripes of the stripe-based layout include 11 MUs of data. Thus, at 756, an LBA is divided by 11 to obtain a stripe address (stripe_id). The mathematical remainder from dividing the LBA by the total quantity of MUs of data of a stripe is a channel identifier (channel_id).

The stripe address is divided total quantity of MUs of a super-MU (SMU) to obtain a logical SMU address (LSMUA). SMUs are used to reduce the size of a mapping table, such as the mapping table 758. For the stripe-based layout described in association with FIGS. 6A-6B, the size of the SMU ("m") is 1,536 MUs. Thus, at 757, the stripe address is divided by 1,356 to obtain the logical SMU index and the logical SMU address. The mathematical remainder is a logical SMU index (LSMUI).

Each entry of the mapping table 758 is a physical SMU address (PSMUA). The mapping table 758 is used to map the logical SMU address to a physical SMU address of the memory device.

For stripe-based layouts, command queues are partition based in contrast to stripe based for a slice-based layout. For the stripe-based layout described in association with FIGS. 6A-6B, where there are thirty-two partitions 624 per MA, there are command queues for each of the thirty-two partitions 624. As with the command queues for a slice-based layout. Each of the command queues for a partition can be associated with a particular type of command, such as a read queue for read commands, a write queue for write commands, and a RMW queue for RMW commands.

For stripe-based layouts, command queues schedulers can be used in a similar way as described with slice-based layouts described herein. However, because the stripe-based layout does not have partial stripes (e.g., the stripe 228 described in associate with FIG. 2), the command queue schedulers for stripe-based layouts do not have to provide special treatments for partial stripes.

Figure 8:
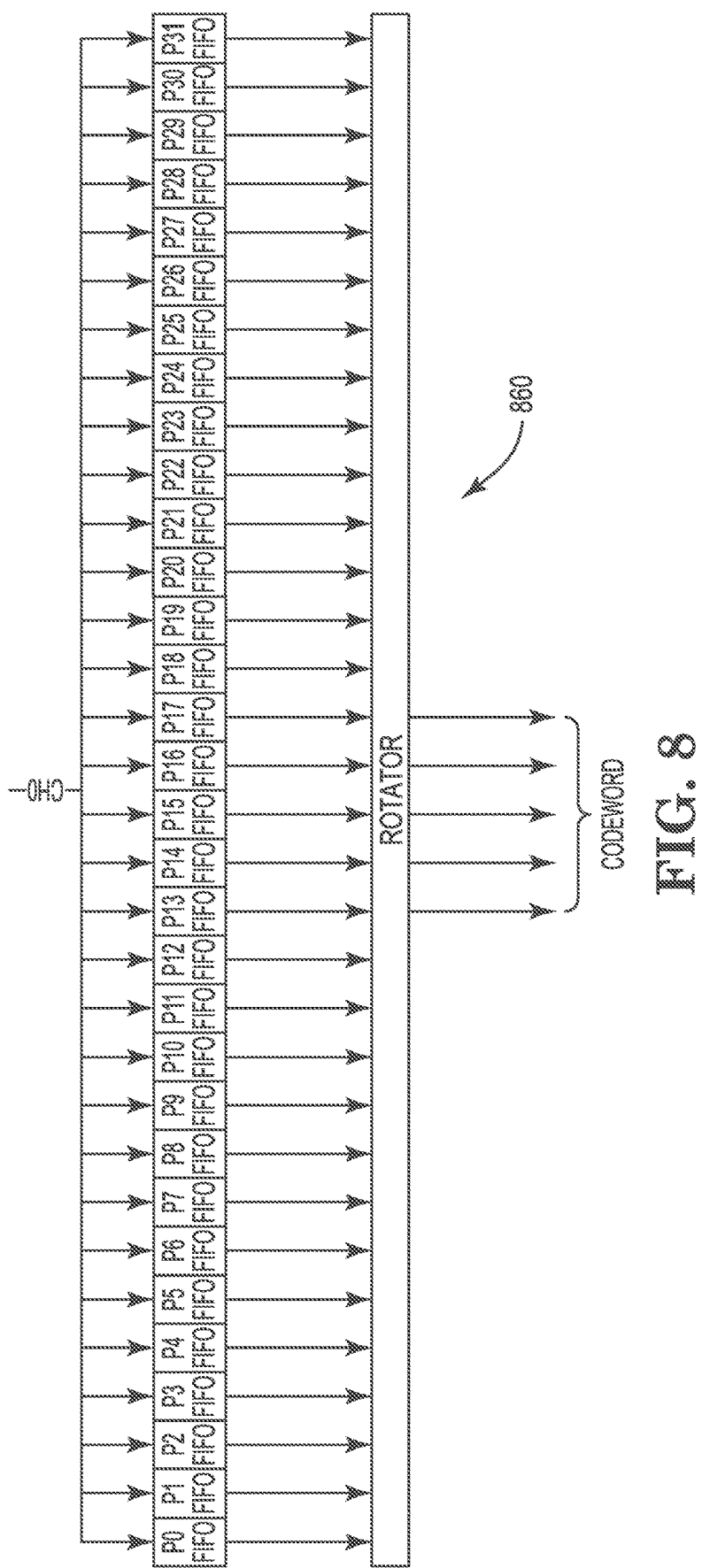
FIG. 8 is a diagram representative of a partition FIFOs arrangement for a stripe-based layout in accordance with a number of embodiments of the present disclosure.

FIG. 8 is a diagram representative of a partition FIFOs arrangement 860 for a stripe-based layout in accordance with a number of embodiments of the present disclosure. For stripe-based layouts, such as the stripe-based layout described in association with FIGS. 6A-6B, each channel has 32 partition FIFOs as illustrated by the partition FIFOs arrangement 860. The partition FIFO arrangement 860 illustrates partition FIFOs for channel 0. However, the partition FIFO arrangement 860 can be replicated for channels 1-11.

A write buffer of a memory controller can be used for congestion management in accordance with a number of embodiments of the present disclosure. An access command can be associated any channel of a stripe. However, the access commands may not be associated with channels of a stripe evenly. At least one embodiment of the present disclosure provides congestion management. As such, a controller, such as the memory system controller 106 described in association with FIG. 1, can include one or more buffers to absorb bursts of commands. A buffer can be associated with a particular type of command, such as the write buffer 961.

If the write buffer is full, then a channel via which write commands are received can be backpressured. Each entry of the write buffer can include CXL RwD message specific information. For example, CXL RwD message specific information can include 64 bytes of data and 2 bits of metadata. The size (n) of the write buffer can be based on a size of hash tables (such as the hash tables 971 described in association with FIG. 9A) used for drift management. In some embodiments, the controller can include a read buffer. Entries of a read buffer can be similar to entries of the write buffer.

At least one embodiment of the present disclosure provides drift management. In some embodiments, to provide a delay of at least a particular amount of time between execution of consecutive access commands (e.g., write commands) to the same address, the previous address can be stored in a CAM. For a write command, both data and parity is written. Thus, a stripe address and a MU address (LBA) are stored in the CAM. The CAM look up key is the stripe address rather than the MU address. If there is a hit for a target stripe address, then metadata of the CAM can be used to determine if the MU address is a hit as well. As used herein, a "hit" refers to a data structure (e.g., hash table, CA) including target data. Conversely, as used herein, a "miss" refers to a data structure not including target data. The MU address will be a hit if the stripe associated with the target stripe address includes a MU of data associated with the MU address.

The size of the CAM can be based on a peak write request rate. A peak write request rate can be high such that to provide a desired minimum delay, the CAM would include thousands of entries. Implementing such a deep CAM with synthesizable logic can be difficult because of quantity of comparators and a priority encoder required to determine a hit in the CAM while satisfying timing requirements.

Figure 9A:
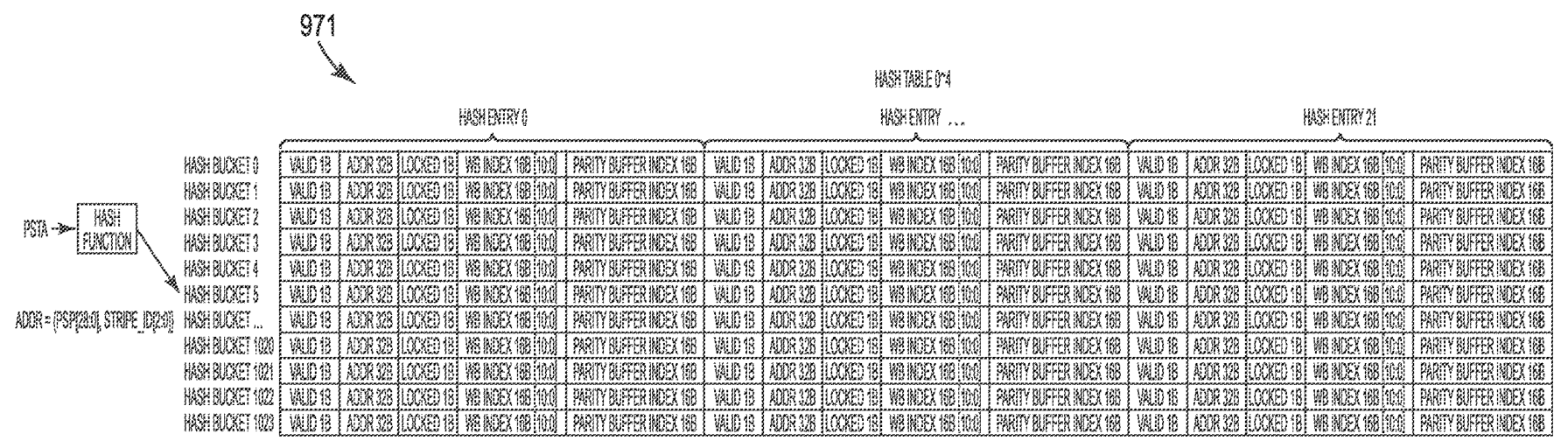
Figure 9B:
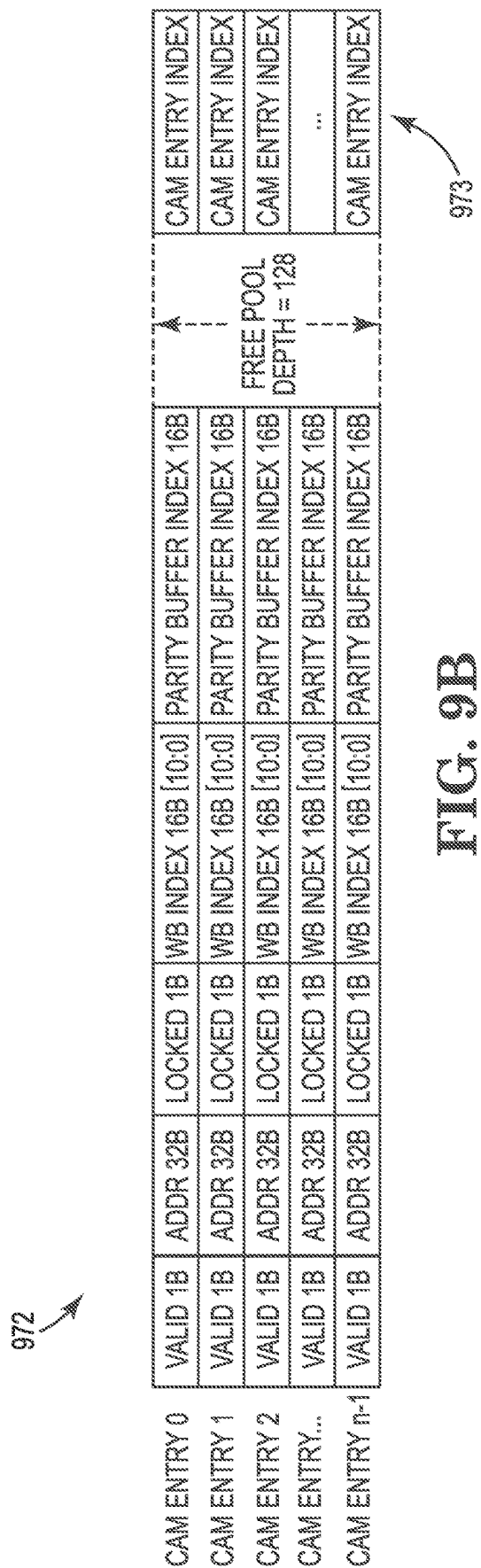

FIGS. 9A-9C are diagrams representative of hash tables 971 and an overflow CAM 972 for drift management in accordance with a number of embodiments of the present disclosure. In some embodiments, as an alternative approach to provide drift management, hash tables, each with a distinct hash function, in conjunction with an overflow (OF) (overflow) CAM are contemplated. The OF CAM is used to approximate behavior of a CAM in the other approach to providing drift management described herein. FIG. 9A illustrates hash tables 971. FIG. 9B illustrates an OF CAM 972. The hash tables 1071 and/or the OF CAM 1072 can be implemented on a controller, such as the memory system controller 106 and/or the management component 112 described in association with FIG. 1.

The hash tables 971 include buckets, each bucket including entries. Although FIG. 9A indicates that there are 5 hash tables (HASH TABLES 0-4), embodiments of the present disclosure are not so limited. For example, fewer than 5 hash tables or greater than 5 hash tables can be used. Each entry contains a bit indicative of validity of the entry, an address, a flag indicative of whether the entry is locked, an index of a command buffer, such as the write buffer described herein, and an index of a parity buffer. For the example slice-based layout or the example stripe based layout described herein, the hash tables 971 include 1,024 buckets, each bucket including 22 entries. However, embodiments are not so limited. For instance, each bucket can include a whole multiple of the quantity of MUs of data per stripe (e.g., 33 entries).

For a slice-based layout, the address of entries of the hash tables 971 is a physical stripe address (PSTA), which includes two fields: a MA (also referred to a physical slice pointer (PSP) and a stripe address (stripe_id). The hash function key is not the address stored of a hash entry, but rather a physical stripe address (PSTA). For a slice-based layout, a PSTA is a PSP multiplied by a quantity of stripes per slice, plus the stripe address. For a stripe-based layout, a PSTA is a PSMUA plus a PSMUI.

The locked flag indicates that the corresponding command (e.g., write command) has already been communicated to a memory device (e.g., the non-volatile memory device 116 described in association with FIG. 1) for execution. The write buffer index points to a location of a write buffer at which data associated with the write command is stored. The parity buffer index points to a location of the parity buffer where stripe parity is stored.

As illustrated by FIG. 9B, entries of the OF CAM 972 have the same format as entries of the hash tables 971. A free pool 973 can be used for allocating entries of the OF CAM 972.

A write command can allocate entries of a write buffer for storing data to be written and then translate a LBA of the write command to obtain a corresponding PSTA, PSP, and stripe address. The PSTA, PSP, and stripe address is used to look up in the hash tables 971 and the OF CAM 972. The PSTA is hashed by each respective hash functions of the hash tables 971 to identify a bucket of each of the hash tables 971. The PSP and the stripe address is compared to the addresses of all entries of the identified buckets of the hash tables 971, and possibly the addresses of the OF CAM 972.

If comparing the PSP and the stripe address results in a miss, then an entry is allocated from a bucket (e.g., the least full bucket of the identified out of the selected buckets) and information associated with the write command is stored in the allocated entry. If no entry is available, then an entry is allocated from the OF CAM 972 and information associated with the write command is stored in the allocated entry of the OF CAM 972. If the OF CAM 972 is full, then the channel via which the write commands are received is backpressured.

If comparing the PSP and the stripe address results in a hit, the write buffer index is written into the corresponding entry of the hash tables 971, if that entry is not locked. If the corresponding entry of the hash tables 971 is locked, then a new entry is allocated from a bucket (e.g., the least full bucket of the identified out of the selected buckets) and information associated with the write command is stored in the allocated entry. If no entry is available, then an entry is allocated from the free pool 973 and information associated with the write command is stored in the allocated entry of the OF CAM 972. If the OF CAM 972 is full, then the channel via which the write commands are received is backpressured.

If comparing the PSP and the stripe address results in more than one hit, then one of the entries is in the locked state, and the corresponding write buffer index of the write command is overwritten the write buffer index of the entry in the unlocked state. The overwritten write buffer index can be released.

A read command can allocate an entry of a read buffer and then translate a LBA of the read command to obtain a corresponding PSTA, PSP, and stripe address. Although the hash tables 971 and the OF CAM 972 are shown for write commands, the following description for read commands is in reference to the hash tables 971 and the OF CAM 972. Instead of a write buffer index, a read buffer index would be stored. The read buffer index points to a location of a read buffer at which data associated with the read command can be stored. The PSTA, PSP, and stripe address is used to look up in the hash tables 971 and the OF CAM 972. The PSTA is hashed by each respective hash functions of the hash tables 971 to identify a bucket of each of the hash tables 971. The PSP and the stripe address is compared to the addresses of all entries of the identified buckets of the hash tables 971.

If comparing the PSP and the stripe address results in a miss, then the read command is enqueued into one or more command queues (described herein) for reading data from the memory device. If comparing the PSP and the stripe address results in a hit, the write buffer index of the corresponding entry of the hash tables 971 is used to read data from the read buffer. If comparing the PSP and the stripe address results in more than one hit, then one of the entries is in the locked state and the write buffer index of the entry in the unlocked state is used to read data from the read buffer.

Figure 10A:
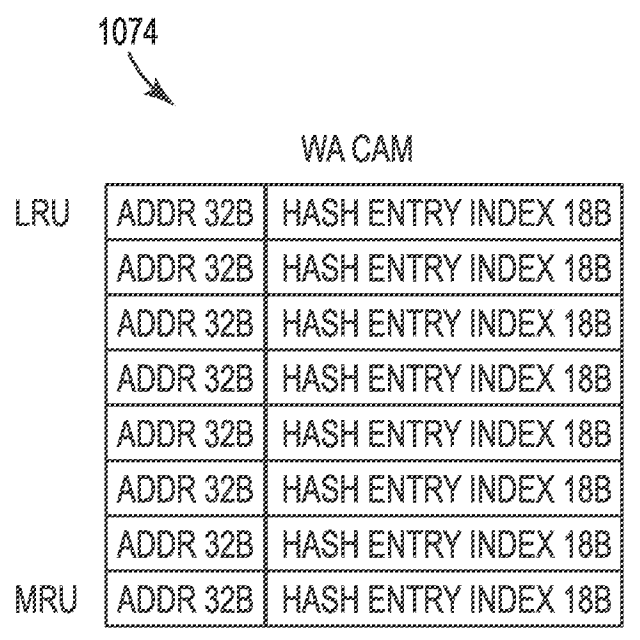
Figure 10B:
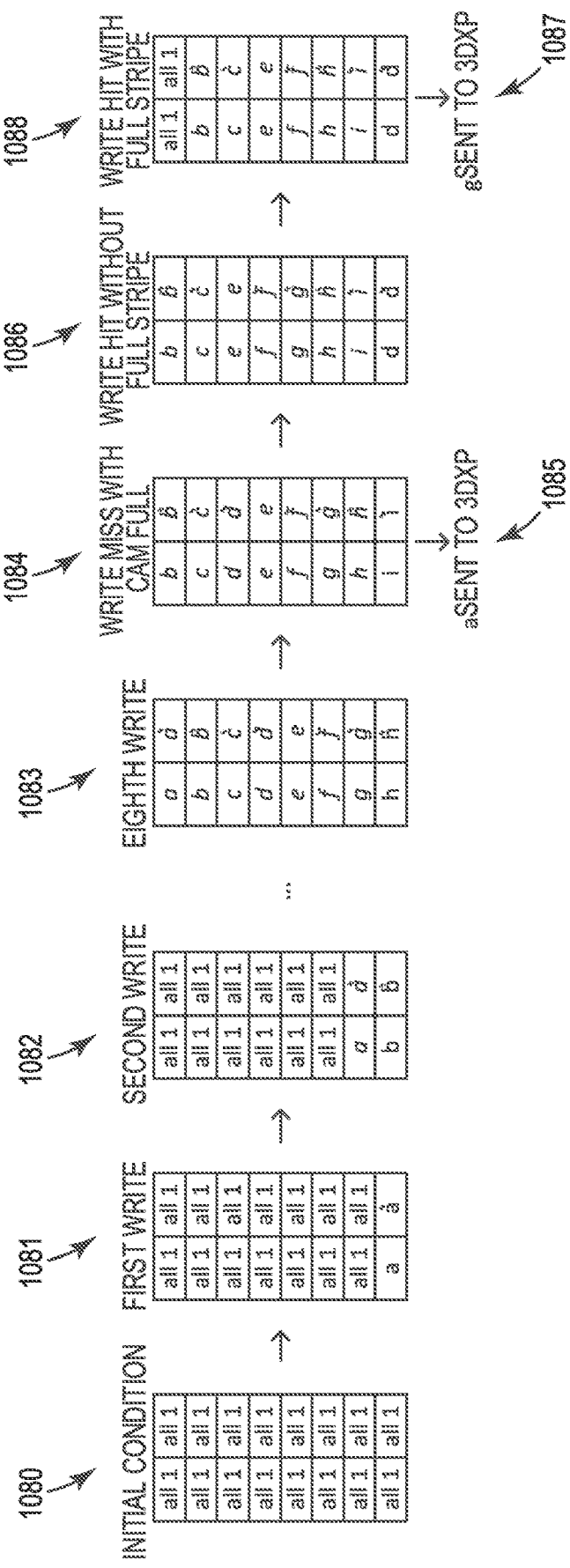

FIGS. 10A-10B are diagrams representative of a write aggregating (WA) CAM 1074 for stripe management in accordance with a number of embodiments of the present disclosure. FIG. 10A illustrates the WA CAM 1074 for assembling MUs associated with the same stripe. The WA CAM 1074 can be implemented on a controller, such as the memory system controller 106 and/or the management component 112 described in association with FIG. 1.

As described herein, writing a MU of data (a partial stripe write), includes rewriting a corresponding parity MU, which can include reading both the pre-write ("old") MU of data and the pre-write ("old") parity MU. Writing multiple MU of data associated with the same stripe can include rewriting a respective parity MU corresponding to each MU of data to be written. Respective pre-write ("old") MUs of data and pre-write ("old") parity MUs are read for each MU of data to be written.

In some embodiments, to reduce, or even minimize, reading and/or writing of parity (e.g., parity MUs), addresses (e.g., stripe addresses) can be stored in the WA CAM 1074, which can be used to assemble as many MUs of data of a stripe as possible. The lookup key is the same as the hash tables 971 described in association with FIG. 9A. As illustrated by FIG. 10A, metadata of the WA CAM 1074 includes hash table entry indices of the hash tables 971. The most recently used (MRU) location of the WA CAM 1074 is at the bottom of the WA CAM 1074. The least recently used (LRU) location of the WA CAM 1074 is at the top of the WA CAM 1074. Although FIGS. 10A-10B illustrate the WA CAM 1074 including 8 entries, embodiments of the present disclosure are not so limited. For example, the WA CAM 1074 can include fewer than 8 entries or greater than 8 entries.

FIG. 10B illustrates exemplary states of the WA CAM 1074 following execution of multiple writes. As illustrated at 1080, because the hash tables 971 and the WA CAM 1074 are initially empty (with no valid entries), the entries of the WA CAM 1074 are set to all 1 values, indicating invalid entries. After the first hash entry (a) is inserted into the hash tables 971, the same address (a) is looked up in the WA CAM 1074. If the WA CAM 1074 does not include the address (a), then, as illustrated at 1081, the address (a) and the associated hash table entry index (a') are inserted into the MRU location of the WA CAM 1074.

After the second hash entry (b) is inserted into the hash tables 971, the same address (b) is looked up in the WA CAM 1074. If the WA CAM 1074 does not include the address (b), then, as illustrated at 1082, the address (b) and the associated hash table entry index (b') are inserted into the MRU location of the WA CAM 1074. The address (a) and the associated hash table entry index (a') are shifted toward the LRU of the WA CAM 1074.

After the third hash entry (c) is inserted into the hash tables 971, the same address (c) is looked up in the WA CAM 1074. If the WA CAM 1074 does not include the address (c), then, as illustrated at 1083, the address (c) and the associated hash table entry index (c') are inserted into the MRU location of the WA CAM 1074. The addresses (a, b) and the associated hash table entry indices (a', b') are shifted toward the LRU of the WA CAM 1074.

As illustrated at 1084, this process continues until all 8 entries of the WA CAM 1074 are occupied (are valid). After the nineth hash entry (i) is inserted into the hash tables 971, the same address (i) is looked up in the WA CAM 1074. If the WA CAM 1074 does not include the address (i), then, as illustrated at 1085, the address (i) and the associated hash table entry index (i') are inserted into the MRU location of the WA CAM 1074. The addresses (a, b, c, d, e, f, g, h) and the associated hash table entry indices (a', b', c', d', e', f', g', h') are shifted toward the LRU of the WA CAM 1074. As illustrated at 1085, shifting the address (a) and the hash table entry index (a') out of the LRU location of the WA CAM 1074 causes the address (a) to be sent to the memory (e.g., the non-volatile memory device 116) to perform write accesses. The write accesses can be enqueued into command queues as described herein. A parity buffer (not shown) can be allocated with both the parity and the write count initialized to 0.

After the tenth hash entry (d) is inserted into the hash tables 971, the same address (d) is looked up in the WA CAM 1074. If the WA CAM 1074 includes the address (d) and the stripe corresponding to the address (d) has not yet become a full stripe, then, as illustrated at 1086, the address (d) and the associated hash table entry index (d') moved within the WA CAM 1074 to the MRU location of the WA CAM 1074. The addresses (e, f, g, h, i) and the associated hash table entry indices (e', f', g', h', i') are shifted toward the LRU of the WA CAM 1074. The addresses (b, c) and the associated hash table entry indices (b', c') are not shifted or moved within the WA CAM 1074.

After the eleventh hash entry (g) is inserted into the hash tables 971, the same address (g) is looked up the WA CAM 1074. If the WA CAM 1074 includes the address (g) and the stripe corresponding to the address (g) has become a full stripe, then, as illustrated at 1087, the address (g) to be sent to the memory to perform write accesses. As illustrated at 1088, the address (g) and the associated hash table entry index (g') are removed from the WA CAM 1074. The addresses (b, c, e, f) and the associated hash table entry indices (b', c', e', f') are shifted toward the LRU of the WA CAM 1074. The LRU entry of the WA CAM 1074 is set to all 1 values, indicating an invalid entry. The addresses (h, i, d) and the associated hash table entry indices (h', i', d') are not shifted or moved within the WA CAM 1074.

In some embodiments of the present disclosure, a machine of a computer system (e.g., the computing system 100 described in association with FIG. 1) within which a set of instructions, for causing the machine to perform any one or more of the methodologies discussed herein, can be executed. A machine of a computer system that includes, is coupled to, or utilizes a memory system (e.g., the memory system 104). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In some embodiments, a computer system can include a processing device, a main memory (e.g., read-only memory (ROM), flash memory, dynamic random access memory (DRAM) such as synchronous DRAM (SDRAM) or Rambus DRAM (RDRAM), etc.), a static memory (e.g., flash memory, static random access memory (SRAM), etc.), and a data storage system, which communicate with each other via a bus.

The processing device can be one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device can also be one or more special-purpose processing devices such as an application specific integrated circuit (ASIC), a field programmable gate array (FPGA), a digital signal processor (DSP), network processor, or the like. The processing device can be configured to execute instructions for performing the operations and steps discussed herein. The computer system can further include a network interface device to communicate over the network.

The data storage system can include a machine-readable storage medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    storing managed units (MUs) of data on a memory device according to a slice-based layout, wherein a slice of the slice-based layout comprises a plurality of stripes, wherein:
        each of the stripes comprises a respective plurality of partitions and a respective plurality of MUs of data,
        each stripe of a first subset of the stripes comprises a first quantity of partitions and a first quantity of MUs of data, and
        each stripe of a second subset of the stripes comprises a second quantity of partitions that is less than the first quantity of partitions and a second quantity of MUs of data that is less than the first quantity of MUs of data,
    translating an address of a target MU of data to a particular slice address, wherein translating the address of the target MU of data comprises dividing the address by a per-slice quantity of MUs of the slice-based layout to obtain the particular slice address.

2. The method of claim 1, further comprising decoding a remainder of dividing the address by the per-slice quantity of MUs to a particular stripe identifier and a particular channel identifier.

3. The method of claim 1, further comprising mapping the particular slice address to a particular physical super-slice address corresponding to a plurality of slices including a particular slice associated with the particular slice address.

4. The method of claim 1, further comprising, for each respective stripe of a slice, queueing commands to be executed on data corresponding to that stripe.

5. The method of claim 1, further comprising, for each respective stripe of a slice, storing commands to be executed on data corresponding to that stripe in respective buffers by type of command.

6. An apparatus, comprising a management component of a memory system configured to:
    store managed units (MUs) of data and parity MUs on a memory device of the memory system, according to a slice-based layout such that each slice of the slice-based layout comprises:
        a plurality of partitions of the memory device; and
        a plurality of stripes, wherein each of the stripes comprises a respective plurality of MUs of data and a respective parity MU, wherein each MU of the stripe corresponds to a respective channel of the memory device, wherein:
            each stripe of a first subset of the stripes comprises a first quantity of MUs of data, and
            each stripe of a second subset of the stripes comprises a second quantity of MUs of data that is less than the first quantity of MUs of data;
            each stripe of the slice comprises a respective subset of the partitions;
            each stripe of the first subset comprises a first quantity of partitions;
            each stripe of the second subset comprises a second quantity of partitions that is less than the first quantity of partitions; and
    execute commands associated with each respective stripe according to a plurality of scheduling policies.

7. The apparatus of claim 6, wherein the management component is further configured to queue commands associated with each respective stripe according to respective types of the commands.

8. The apparatus of claim 7, wherein the management component further comprises a respective plurality of buffers associated with each of the stripes,
    wherein each of the buffers is configured to store commands of a particular type associated with that stripe.

9. The apparatus of claim 7, wherein the management component is further configured to implement a plurality of linked lists to queue the commands associated with each respective stripe.

10. The apparatus of claim 6, wherein the management component further comprises a respective plurality of first in first outs (FIFOs) for each channel of the memory device.

11. The apparatus of claim 6, wherein:
    the first quantity of data MUs is eleven data MUs,
    the second quantity of MUs of data is three MUs of data,
    the memory device comprises twelve channels and thirty-two partitions,
    the first quantity of partitions is five partitions, and
    the second quantity of partitions is two partitions.

12. An apparatus, comprising a management component of a memory system configured to:
    store managed units (MUs) of data and parity MUs on a memory device of the memory system according to a stripe-based layout such that each stripe of the stripe-based layout comprises a plurality of partitions of the memory device, wherein:
        each partition of the memory device corresponds to more than one stripe, and
        each MU of data is associated with a respective stripe; and
    cause execution of commands associated with each respective stripe according to a plurality of scheduling policies,
    wherein the management component further comprises a respective plurality of first in first outs (FIFOs) for each channel of the memory device and a quantity of FIFOs for each channel of the memory device is equal to a quantity of stripes for each respective memory address.

13. The apparatus of claim 12, wherein the management component is further configured to queue commands associated with each respective stripe according to respective types of the commands.

14. The apparatus of claim 13, wherein the management component further comprises a respective plurality of buffers associated with each of the stripes,
wherein each of the buffers is configured to store commands of a particular type associated with that stripe.

15. The apparatus of claim 13, wherein the management component is further configured to implement a plurality of linked lists to queue the commands associated with each respective stripe.

16. The apparatus of claim 12, further comprising a controller of the memory system comprising the management component.

17. A method, comprising:
storing managed units (MUs) of data on a memory device according to a slice-based layout, wherein a slice of the slice-based layout comprises a plurality of stripes, wherein:
each of the stripes comprises a respective plurality of partitions and a respective plurality of MUs of data,
each stripe of a first subset of the stripes comprises a first quantity of partitions and a first quantity of MUs of data, and
each stripe of a second subset of the stripes comprises a second quantity of partitions that is less than the first quantity of partitions and a second quantity of MUs of data that is less than the first quantity of MUs of data;
translating an address of a target MU of data to a particular slice address;
mapping the particular slice address to a particular physical super-slice address corresponding to a plurality of slices including a particular slice associated with the particular slice address.

18. The method of claim 17, further comprising mapping the particular physical super-slice address to a particular physical address corresponding to the address of the target MU of data.

* * * * *